United States Patent

[11] 3,573,608

| [72] | Inventors | Joseph A. Marino<br>Hopkins;<br>Richard S. MacCrea, New Brighton, Minn. |
|---|---|---|
| [21] | Appl. No. | 767,795 |
| [22] | Filed | Oct. 15, 1968 |
| [45] | Patented | Apr. 6, 1971 |
| [73] | Assignee | Marquette Corporation<br>Minneapolis, Minn. |

[54] ENGINE ANALYZING APPARATUS WITH CATHODE RAY DISPLAY
11 Claims, 8 Drawing Figs.

| [52] | U.S. Cl. | 324/15, 73/117.3 |
|---|---|---|
| [51] | Int. Cl. | G01m 15/00 |
| [50] | Field of Search | 324/15, 16, 19; 73/116, 118, 117.2, 117.3 |

[56] References Cited
UNITED STATES PATENTS

| RE26,163 | 2/1967 | Heyer | 324/19X |
|---|---|---|---|
| 3,404,333 | 10/1968 | Roberts | 324/15 |
| 3,409,824 | 11/1968 | Makuh | 324/15 |

*Primary Examiner*—Michael J. Lynch
*Attorneys*—Frederick E. Lange, John J. Held, Jr. and Eugene L. Johnson ABSTRACT: Engine analyzing apparatus for an internal combustion engine in which a signal indicative of a condition of the ignition system is superimposed upon a horizontal trace of a cathode ray and in which the horizontal trace is initiated at the time the distributor points close rather than when they open. There may be a plurality of horizontal traces, one for each cylinder, arranged to give a "raster" display or the conditions associated with the various cylinders may be displayed in sequence in a "parade" display. Provision is made for displaying the condition of each cylinder by itself or displaying the conditions of any combination of cylinders either individually or in superimposed fashion.

INVENTORS
JOSEPH A. MARINO,
RICHARD S. MAC CREA
BY Frederick E. Lange
ATTORNEY

INVENTORS
JOSEPH A. MARINO,
RICHARD S. MAC CREA
BY Frederick E. Lange
ATTORNEY

ENGINE ANALYZING APPARATUS WITH CATHODE RAY DISPLAY

BACKGROUND OF THE INVENTION

One type of apparatus that is commonly used for testing internal combustion engines is one employing a cathode-ray tube having a display screen on which is portrayed one or more conditions associated with the operation of the engine. In a typical apparatus of this type, there is produced on the screen of the cathode-ray tube a substantially horizontal trade produced by applying a voltage between the horizontal deflection plates of the tube. The signal being measured is then applied to vertical deflection plates. Typical signals which are produced are signals responsive to the secondary voltage of the ignition transformer and to the voltage existing across the primary winding of the ignition transformer. These voltages are affected by the condition of various elements of the ignition system such as the spark plugs. In the case of a multicylinder internal combustion engine, this information has been displayed in either of two ways. In one case, information has been displayed in a continuous trace which lasts for the complete cycle of the engine, the conditions associated with the various cylinders being displayed sequentially in a predetermined pattern. This type of display has been commonly referred to as a "parade" display. In another type of display, there are a plurality of horizontal traces one above the other, each trace being associated with the operation of one cylinder. The number of such horizontal displays usually corresponds to the number of cylinders. This type of display has been referred to in the industry as "raster" display. In each type of display, it is necessary to initiate the horizontal sweep at a predetermined time in the engine cycle. This is usually done by the occurrence of a particular voltage which can be used to trigger the horizontal sweep. Since the predominant voltage is a voltage which occurs when the ignition "points" first open, it has been customary to initiate the horizontal sweep with the opening of the ignition points. In the case of a raster display, each horizontal sweep has been initiated by the opening of the ignition points. In the case of a parade display, the single horizontal sweep has been initiated by voltage arising from the firing of one particular sparkplug.

The drawback to the prior-type of arrangement has been that the condition being measured is associated with the opening of the points. For example, at the time that the points open, the primary voltage suddenly surges, the primary voltage then decaying in an oscillatory fashion. The same is true of the secondary voltage. As a result, the condition being observed starts at the extreme right-hand end of the trace, is partially blanked out during the retrace of the beam, and then appears at the left-hand side of the trace. Part of the information being measured is lost in this manner.

SUMMARY OF THE INVENTION

The present invention is concerned with engine analyzers discussed above in which the horizontal trace is initiated at the time that the ignition points first close. This trace continues until the points open and then reclose. The result of this type of operation is that the information which it is desired to observe occurs at an intermediate point of the trace where it can be readily observed and where none of it is lost during the retrace of the horizontal sweep of the cathode-ray beam. In the case of the raster-type of display, each horizontal trace is initiated with the closing of the ignition points and is terminated upon the points reclosing. In the case of the parade display, the horizontal sweep is initiated at the time that the points close preparatory to the firing of a selected spark plug. Provision is made for switching between either a raster display or a parade display or presenting either a signal due to the primary voltage or one due to the secondary voltage of the ignition coil. Where the information is disclosed in a parade display, the information in connection with the firing of the selected first plug is displayed first on the screen. In most prior art arrangements, due to the fact that the sweep is not initiated until the points open in connection with the firing of the selected plug, the parade display began with the next plug so that the first plug appeared at the right-hand end of the display, at the end rather than at the beginning.

Provision is also made in our improved apparatus for displaying the information only in connection with one cylinder of any combination of selected cylinders. It is also possible to superimpose the patterns for all of the cylinders upon one single trace.

We accomplish the initiation of the trace at the points closed position by generating a square wave voltage from that produced across the points and initiating the horizontal trace when the instantaneous value of the square wave changes in a manner resulting from closure of the points.

Various other objects of the invention will be apparent from a consideration of the accompanying specification, claims and drawings.

DESCRIPTION OF THE PREFERRED EMBODIMENT

Figure 1A:
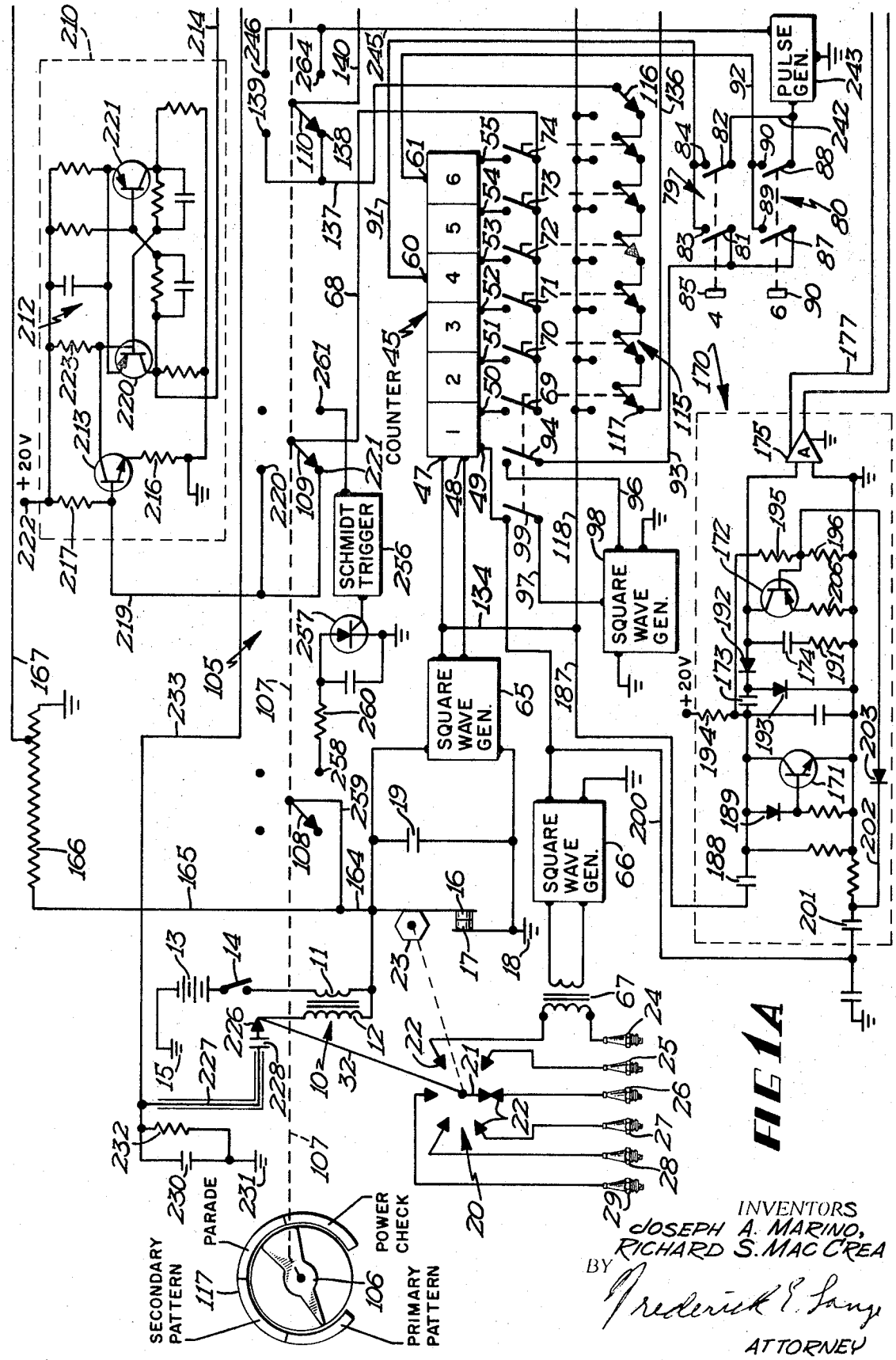
FIGS. 1a and 1b of the drawing collectively show the apparatus in schematic form, the apparatus being shown in connection with sparkplugs and distributor points of a conventional ignition system which likewise is shown in schematic form.
Figure 1B:
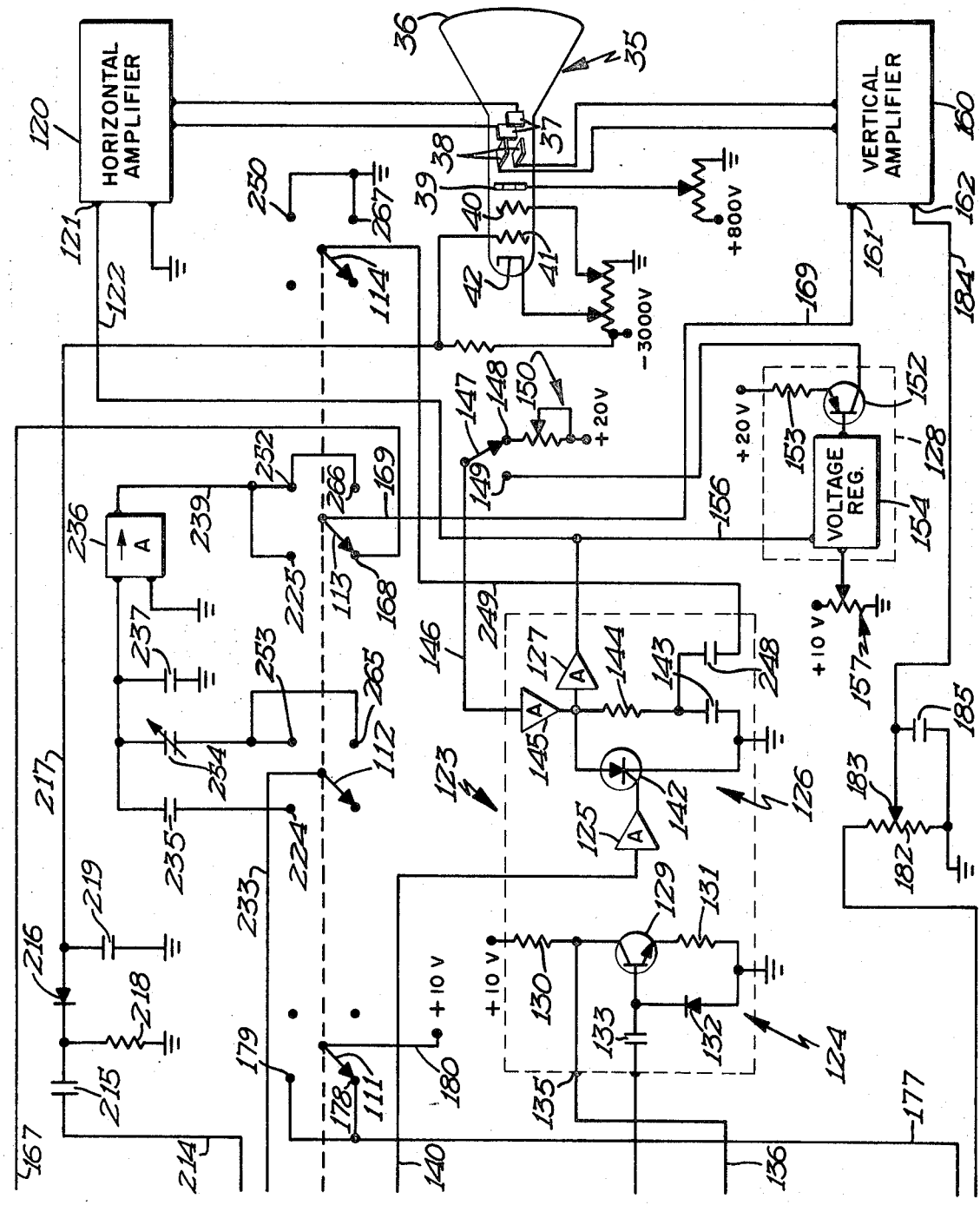

Referring to FIGS. 1a and 1b, I have shown the apparatus connected to an automobile ignition system which is schematically shown in the drawing. Referring to this automobile ignition system, which has been illustratively shown in connection with a six-cylinder engine, the numeral 10 indicates the usual ignition coil having a low voltage primary winding 11 and a high voltage secondary winding 12, the low voltage primary winding 11 being connected to the positive terminal of the automobile battery 13 through some switch such as an "ignition switch" 14. The opposite terminal of battery 13 is connected to ground at 15. The lower terminal of the primary winding 11 is connected to the switch blade 16 which cooperates with switchblade 17 to form the conventional breaker points. Switchblade 17 is grounded at 18. Connected across the switchblades 16 and 17 is a conventional capacitor 19. Cooperating with the switchblade 16 is a six-sided cam 23 which serves to separate switchblades 16 and 17 six times for each revolution of cam 23. The numeral 20 indicates the conventional distributor having a distributor arm 21 which is driven by the engine along with the cam 23 and sequentially makes contact with the plurality of terminals 22, each of which is connected to a different one of the igniters 24—29, which igniters normally take the form of a conventional sparkplug. The various igniters 24-29 are each associated with a different cylinder, igniter 24 being associated with cylinder No. 1 for example. While I have shown the igniters or sparkplugs as located in a continuous row, it is to be understood that they are associated with the cylinders in such a manner as to produce the desired firing sequence. The rotating arm 21 on the distributor is connected in the conventional manner to the high tension or upper terminal of secondary winding 12 through a conductor 32. Upon rotation of the distributor, the voltage across winding 12 is successively applied to the various igniters or sparkplugs in the desired firing sequence.

Turning now to the improved engine analyzer, a cathode-ray tube of conventional type is designated by the reference numeral 35. This tube has the usual fluorescent screen 36, horizontal deflecting plates 37, vertical deflecting plates 38, accelerating anode 39, grid 40, control grid 41 and cathode 42. The cathode is provided with any conventional means for heating the same (not shown). As is conventional with such a cathode-ray tube, when used as an oscilloscope, a beam of electrons emitted from the cathode 42 passes through an aperture in the anode and is variably deflected depending upon the voltages applied between the deflecting plates 37 and 38. The beam will impinge upon the deflecting plate 36 and its point of impingement will depend upon the amount of deflection produced by the deflecting plates 37 and 38. In the operation of such a cathode-ray tube as an oscilloscope, it is conventional to apply a sawtooth voltage between the horizontal plates 37 so that the cathode-ray beam is horizontally moved from one side of the screen 36 to the other at a frequency dependent upon the frequency of the sawtooth voltage. A signal representing the information to be displayed is then placed upon the vertical deflection plates causing deflection of the beam in a vertical direction.

The production of a horizontal sweep voltage which constitutes an important feature of our invention is controlled by an electronic ring counter generally indicated by the reference numeral 45. This ring counter comprises six stages which have been labeled with the numerals 1 through 6 corresponding to the six cylinders of the engine. It is, of course, understood that where the apparatus is designed to operate with an eight cylinder engine as would normally be the practice, there would be eight stages to the counter. Stage 1 is provided with a pair of input terminals 47 and 48 and a reset input terminal 49. Each of the stages 1 through 6 has an output terminal which has been designated in connection with the respective stages by the numerals 50 through 55, respectively. In addition, stages 4 and 6 are provided with auxiliary output terminals 60 and 61, respectively. Each time that an input signal pulse is applied between terminals 47 and 48, the output signal advances from one of the stages to the next stage. Thus, assuming that an output signal appears upon output terminal 50 of stage 1 and a pulse is applied between terminals 47 and 48, the output signal moves to terminal 51 of stage 2 and is removed from terminal 50 of stage 1. The next pulse that is applied between terminals 47 and 48 causes the output signal to be applied to terminal 52 of stage 3 and is removed from terminal 51 of stage 2. This operation continues until the output voltage appears, in the case of a six cylinder engine, at terminal 55 of stage 6. Whenever a signal is applied to the reset terminal 49 of stage 1, the entire counter is reset, causing the output voltage to again appear across terminal 50 of stage 1, so that the counter can again repeat its counting operation. As will be presently explained, input terminals 47 and 48 are connected across the distributor switch or "points" so that a pulse is applied each time a signal is applied to any of the plugs or igniters. The reset signal applied to terminal 49 is derived from the connection between the distributor and any selected sparkplug so that whenever the selected sparkplug is to be fired, the ring counter is reset. By always having the ring counter start its counting operation with the firing cycle of a particular plug, such as a plug for the "Number 1" cylinder; and by successively advancing the counter each time that the points open and close, it is possible to know at all times what cylinder is in the firing portion of its cycle, because the output of the counter will appear across a stage corresponding to the particular plug or igniter that is ready to be fired at that time. One of the tests which the apparatus is designed to perform is that of selectively short circuiting various plugs. As will be described in more detail, provision is made, where the reference plug is being short-circuited for testing purposes, to reset the ring counter whenever a cycle has been completed.

Ring counters of the type of counter 45 are relatively conventional. The counter may be of any of several well-known types. A counter particularly suitable for the purpose is that shown in the copending application Ser. No. 607,820, filed Jan. 6, 1967, for "Ignition Checking System" of Joseph A. Marino.

Referring now in more detail to the connections of the ring counter to the ignition system, it will be noted that the input terminals 47 and 48 of the ring counter are connected to the output terminal of a square wave generator 65, the input terminals of which are connected across the points 16 and 17 of the ignition system and across the conventional condenser 19 in parallel with these points. The voltage derived across these points is somewhat oscillatory in nature and in order to assure proper operation of the ring counter, the voltage is first filtered and then applied to a square wave generator such as a conventional Schmidt trigger. The result of the filtering and the conversion of the filtered signal to a square wave voltage in the Schmidt trigger is to apply to the input terminals 47 and 48 a voltage consisting of series of negative square waves, each square wave corresponding to the closing of the points 16 and 17. Thus, a pulse is supplied to terminals 37 and 38 each time that a voltage is to be applied to one of the igniters.

Referring now to the connection to the reset terminal 49, it will be noted that this terminal is connected to the output terminal of another square wave generator 66 which is similar to square wave generator 65. The input of this square wave generator is in turn connected to the secondary of a transformer 67 having a relatively low impedance primary connected into the connection between the distributor and plug 24 which, as pointed out above, may be the plug for the number 1 cylinder. It is to be understood that in actual practice, the transformer 67 will be incorporated into the coupling cable extending from the distributor to the sparkplug lead and the primary of transformer 67 will be coupled into the connection between the distributor and the sparkplug 24 by disconnecting the normal sparkplug lead and inserting the primary between the sparkplug lead and the sparkplug. The effect of this connection and the filter and Schmidt trigger embodied in the square wave generator is to result in a negative square wave pulse being applied to the reset terminal 49 each time that a firing voltage is applied to plug 24. By resetting the counter each time that a firing pulse is applied to a particular plug, such as the plug for the number 1 cylinder, and by advancing the ring counter one stage at a time each time that the points are reclosed, it will be obvious that the stage in which the output voltage appears also has a definite relationship to the cylinder that is to be fired at that particular time. As will be presently explained, by connecting the analyzing apparatus to the output terminal of a particular stage, it is possible to control the apparatus in accordance with the firing of a particular cylinder. The various voltages appearing at the output terminals of square wave generators 65 and 66 are also employed to control the generation of the horizontal sweep voltage and, under certain conditions, the voltage applied to the vertical deflecting plates.

An output conductor 68 is connected to a series of switches 69—74. By closing any of these switches, the output of a particular stage is connected to the conductor 68. Thus, by closing switch 70, for example, the output of stage 2 is connected to conductor 68; by closing switch 73, the output of stage 5 is connected to conductor 68; etc. As will be pointed out in connection with describing the operation of the apparatus, it is possible to close a number of switches simultaneously where it is desired to perform certain testing operations in connection with several cylinders at once. These switches 69—74 may be toggle switches located on the front of the control panel of the apparatus so as to be readily accessible to the operator.

As previously mentioned, one of the tests which is possible with the present apparatus is that of effectively short circuiting any given igniter or any combination of igniters. As previously pointed out, the reset signal applied to reset terminal 49 is normally derived from the connection to the sparkplug 24 which is associated with, for example, the number 1 cylinder. It will be fairly obvious that if this igniter is being short circuited, the voltage across it will cease to exist and except for the initial power supplied by it before the apparatus controlled by the counter becomes effective to short circuit it, voltage pulses from this igniter are not available as long as this particular sparkplug is being short-circuited. It is accordingly necessary to provide other means for resetting the counter under these conditions. Very generally, this is accomplished by connecting an output of the stage corresponding to the last of the cylinders to be fired, to the reset terminal so as to reset the counter whenever the engine has gone through a complete cycle. This, of course, requires that some means be provided for distinguishing whether the engine is a four or six-cylinder engine. This is accomplished by a pair of cylinder selector switches 79 and 80 of which 79 is designed for operation when a four-cylinder engine is being tested and switch 80 for actuation when a six-cylinder engine is being tested. It is of course understood that if provision is to be made for an eight-cylinder engine, there would be a third similar switch. The switch 79 comprises a pair of switchblades 81 and 82 which cooperate with fixed contacts 83 and 84, respectively. The fixed contacts 83 and 84 are electrically connected together and the switchblades 81 and 82 are mechanically joined together and are operatively connected to an actuating knob 85 which may be disposed on the front panel of the diagnostic apparatus. Upon knob 85 being actuated, switchblades 81 and 82 are moved into engagement with contacts 83 and 84. Switch 80 similarly comprises a pair of movable switchblades 87 and 88 movable into engagement with contacts 89 and 90, respectively. Contacts 89 and 90 are electrically connected together. The movable switchblades 87 and 88 are mechanically connected together and are operatively connected to an actuating knob 90 which, upon actuation, move switchblades 87 and 88 into engagement with fixed contacts 89 and 90. The portion of switches 79 and 80 comprising switchblades 81 and 87 and contacts 83 and 89 is associated with the mechanism for resetting the counter. The other switches are concerned with controlling the horizontal sweep signal under certain conditions and will be referred to later.

Referring to the switchblades 81 and 87 first, the contact 83 is connected through a conductor 91 with the output terminal 60 of stage 4 of the counter 45. Similarly, the terminal 89 associated with switchblade 87 is connected through a conductor 92 to the auxiliary output terminal 61 of stage 6 of the counter 45. The two switchblades 81 and 87 are electrically connected together and through a conductor 93, a switch 94 and a conductor 96 to the input of a square wave generator 98 similar in function to the square wave generator 65. In other words, the voltage from either output terminal 60 associated with stage 4 or the voltage from output terminals 61 associated with stage 6, depending upon whether switch 79 or 80 is closed, is first filtered and then converted into a square wave output in the square wave generator 98. The output terminal of square wave generator 98 is in turn connected through a conductor 97 and a further switch 99 to the reset terminal 49 of stage 1. It is to be understood that switches 94 and 99 are mechanically connected to switch 69 so that when manual switch 69 is closed to connect the output of stage 1 with the conductor 68, switches 94 and 99 are closed to connect the switchblades 81 and 87 to the input of the square wave generator and to connect the output of the square wave generator to the reset terminal. Thus, when switch 69 is closed and either switch 79 or switch 80 is closed, depending upon whether a four or six-cylinder engine is being tested, an output signal of stage 4 or stage 6 is passed through the square wave generator and used to reset the ring counter. Under these conditions, the ring counter is reset each time that the engine has gone through a complete cycle so that even though the plug of the number 1 cylinder is being effectively short circuited, the ring counter is still reset at the end of every cycle.

The various tests to be performed are controlled by a selector switch indicated in its entirety by the reference numeral 105. The switch comprises a knob 106 connected by a shaft 107 to a plurality of switchblades 108—114. The knob 106 and the switchblades 108—114 have four possible positions. It will be noted that the knob 106 has a pointer which cooperates with the scale 117 having four segments labeled "Primary Pattern," "Secondary Pattern," "Parade," and "Power Check." In the "Primary Pattern" position, the voltage applied to the vertical deflection plates is dependent upon the voltage existing across the primary of the ignition transformer. In the "Secondary Pattern," the voltage applied to the vertical deflection plates is dependent upon the voltage existing across the secondary of the ignition transformer 10. In the "Parade" position of knob 106, the conditions existing in connection with the various cylinders are displayed in sequence in a parade pattern. In this case, the signal applied to the vertical deflection plates is dependent upon the secondary voltage. In the "Power Check" position of knob 106, the apparatus is designed for selectively short-circuiting various of the sparkplugs. In this condition also, there is displayed on the cathode-ray screen a signal based upon the secondary voltage, the signals being displayed in parade fashion.

While I have shown only four positions of switch 106 for purposes of simplicity, it is to be understood that in the actual commercial apparatus, there are other positions provided for to test other conditions. The four conditions illustrated, however, are illustrative of the present invention.

PRIMARY PATTERN

It will be noted that knob 106 in the position labeled "Primary Pattern," that is, the position in which the information displayed on the cathode-ray screen is the voltage existing across the primary winding of ignition transformer 10. This information may be displayed in any of various ways. For example, the various primary patterns may be superimposed upon one another so that the signal shown in a composite of the primary voltage existing across the condition with the firing of all of the cylinders. Or, the information may be individually displayed in connection with each of the plugs in a series of vertically displaced horizontal raster lines, one for each cylinder. Again, any one cylinder may be selected so that there is a single sweep associated with only one cylinder. Or, the apparatus is designed to provide for displaying the information only in connection with certain cylinders, this information being displayed in individual raster lines corresponding in number to the number of cylinders whose operation is being observed. The condition will be considered first in which the information is disclosed in superimposed fashion. Under these conditions, each horizontal sweep is equal in time duration to the time existing between the time that points 16 and 17 first close until they have opened and again reclosed. In other words, the sweep will be repeated as many times during the cycle of the engine as there are cylinders.

Considering first the method of producing the horizontal sweep, it will be noted that the horizontal plates 37 are connected to the output terminals of a horizontal amplifier 120. This amplifier may be of any conventional type which can amplify a horizontal sweep voltage within the frequency range encountered. The ungrounded input terminal 121 of the horizontal amplifier is in turn connected through a conductor 122 to the output terminal of a horizontal sweep generator generally indicated by the reference numeral 123. This sweep generator 123 comprises an inverter section 124, an amplifier 125, a sweep generator 126 and an output amplifier 127. Under certain conditions, the operation of sweep generator 123 is controlled by an automatic sweep unit 128.

Referring in more detail to the sweep generator 123, and initially to the inverter 124, this inverter comprises an NPN transistor 129, the collector of which is connected through a resistor 130 to a suitable positive source DC voltage such as a source of $\pm 10$ volts. The emitter is connected to ground through a resistor 131. The base has a diode 132 connected between the base and ground so as to allow only part of the signals to be applied to the base of the transistor. A capacitor 133 is connected between the base and an input terminal of the sweep unit 123. Referring generally to the function of the inverter unit, a positive signal applied to the base of transistor 129 produces a negative voltage which is applied to the input of the amplifier stage 125. The inverter 124 is employed whenever the sweep is to start at the time the points are open. When it is desired to have the sweep start with the points closed, the inverter 124 is bypassed by a switch generally indicated by the reference numeral 115. The switch 115 consists of seven switches, the first six of which proceeding from the left correspond to the six cylinders, the switchblades of these first six being interlocked with switchblades and switches 69-—74, previously described. The seventh switch, that is, the one on the far right is a separate switch used when it is desired to go from composite display beginning with the points open position to a composite display beginning with the points closed position. Each of the seven switches of switch 115 moves between a lower fixed contact and an upper fixed contact. The switchblade of each of the switches is electrically connected to the lower fixed contact of the next switch to the right so that when the switches are in the position shown, a complete circuit can be established from the switchblade 116 of the right-hand switch to the lower contact 117 of the extreme left-hand switch. Upon movement of any one of the seven switches, however, from its engagement with its lower contact, this circuit through the switchblades is interrupted. Each of the upper fixed contacts of the seven switches comprising the switch assembly 115 is connected to a conductor 118, the right-hand end of which is connected to the capacitor 133 of the inverter unit and the left-hand end of which is connected by a conductor 134 to an output terminal of the square wave generator 65. Thus, when the switches are in the position shown, the output of the square wave generator 65 is connected through capacitor 133 to the base of transistor 129. The lower fixed terminal 117 of the left-hand switch of switch assembly 115 is connected through a conductor 136 to the terminal of the sweep generator 123 connected to the collector of transistor 129. The switch blade 116 of the extreme right-hand switch is connected through a conductor 137 to two fixed contacts 138 and 139 of switching assembly 105, which switching contacts are engaged by switchblade 110 whenever the switch is either in the "Primary Pattern" or "Secondary Pattern" positions. The switchblade 110 is in turn connected through a conductor 140 to the input terminal of the amplifier 125 of the sweep generator.

Amplifier 125 controls the conductivity of a silicon-controlled rectifier 142, the output of the amplifier being connected to the trigger electrode of the silicon-control rectifier. This silicon-controlled rectifier, commonly referred to as an "SCR" controls, in turn, the charging and discharging of a capacitor 143 which has one terminal connected to the cathode of the SCR 142 and the other terminal connected through a resistor 144 to the anode. It will be obvious that whenever the SCR 142 becomes conductive as a result of having a signal applied to its trigger electrode from amplifier 125, the capacitor 143 is discharged. The capacitor 143 is then gradually recharged through charging circuits which will presently be described. Thus, the capacitor 143 is periodically charged until the SCR 142 becomes conductive at which time the capacitor 143 discharges and begins charging again. Since the signal supplied by amplifier 125 is of only momentary duration and since the discharging capacitor 143 temporarily short circuits the SCR, the SCR will cease to be conductive until a new pulse is received from amplifier 125. The upper terminal of resistor 144 is connected to the input terminal of amplifier 127 and the output of this amplifier is in turn connected through conductor 122, as previously described, to the input terminal of horizontal amplifier 120. Thus, the sweep generator 123 causes a sawtooth wave voltage to be applied to the input of horizontal amplifier 120.

The maximum amplitude of the horizontal sweep signal determines the extent of the horizontal movement of the cathode-ray beam across the screen 36. It will be obvious that the amplitude that the sweep voltage obtains before the capacitor 143 is discharged by the firing of the SCR 142 is dependent upon the rate of charging of capacitor 143 and the time existing before successive firings of the SCR. The time between successive firings of the SCR is determined by the speed at which the engine is operating. The rate at which the capacitor 143 is charged is controlled by apparatus which will now be described.

It will be noted that resistor 144 in series with capacitor 143 is connected through a current amplifier 145 and a conductor 146 to a switchblade 147 which is movable into engagement with either of two fixed contacts 148 and 149. The switchblade 147 is shown in engagement with contact 148, this being the position it assumes when the extent of the sweep is manually adjusted. The terminal 148 is connected through a variable resistor 150 to a positive source of potential such as ±20 volts. It will be obvious that when the switchblade 147 is engaged with contact 148, a charging circuit for capacitor 143 is established from this positive voltage source through rheostat 150, switch contact 148, switchblade 147, conductor 146, current amplifier 145, resistor 144, and capacitor 143 to ground. The rate of which capacitor 143 is charged depends upon the setting of the slider of the variable resistor 150. When the switch 147 is in this position calling for manual adjustment of the horizontal sweep, the extent of the sweep will vary with engine speed. Where the engine is run at a relatively constant speed, however, it is possible by adjusting the slider of rheostat 150 to select the desired extent of sweep and to maintain this sweep relatively constant as long as the engine speed is constant. It will be understood that the slider of the rheostat 150 is operated by a knob which is located on the front of the instrument panel so as to be accessible to the operator.

When the switchblade 147 is moved into engagement with fixed contact 149, the amplitude of the sweep voltage is automatically regulated regardless of engine speed. When the switch is in this position, it is in engagement with contact 149 which is connected into the emitter-collector circuit of a transistor 152. The emitter of this transistor is connected in series with a positive source of DC voltage such as +20 volts through a resistor 153. Thus, a charging circuit is established for capacitor 143 from this positive source of voltage through resistor 153, the emitter-collector circuit of transistor 152, contact 149, switchblade 147, conductor 146, current amplifier 145, resistor 144, and capacitor 143 to ground.

It will be obvious that by varying the resistance of the emitter-collector path of transistor 152, the charging rate can be varied. This is done by means of the voltage regulator 154 which has two input terminals. This voltage regulator may be a typical voltage regulator of the type which compares the voltage being regulated with a constant voltage and operates to perform a switching function whenever the voltage being regulated exceeds the desired value. Such voltage regulators are well-known in the prior art and need not be described in detail here. One of the two input terminals of the voltage regulator 154 is connected through a conductor 156 to the output of the amplifier 127 of the sweep generator 123. The other input terminal is connected to the slider of a voltage divider 157 which is connected between a reference voltage such as +10 volts and ground. This input terminal of the voltage regulator is thus maintained at a relatively constant voltage. The voltage regulator is effective whenever the sweep voltage applied to conductor 156 exceeds the selected voltage to vary the conductivity of the transistor 152 by varying the base-emitter voltage. This is turn causes a variation in the charge rate of capacitor 143. The apparatus is designed whenever the sweep voltage tends to exceed the selected value to decrease the conductivity of the emitter-collector path of transistor 152 to decrease the charge rate of the capacitor 143. This in turn reduces the maximum voltage of the sweep voltage. Thus, with the automatic sweep regulator 128 connected into this circuit when switch 147 is in engagement with contact 149, the maximum value of the sweep voltage is automatically regulated regardless of engine speed.

Figure 3:
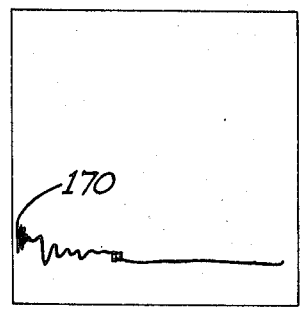
FIG. 3 is a view similar to FIG. 2 but in which the trace is initiated at the time that the points open, as has been done in the past.

Referring to the overall operation of the sweep generator, the operation will be considered with all of the switches in the position shown. Under these conditions, there is a direct connection between the output of the square wave generator 65 and capacitor 133 connected to base of transistor 129, this connection being through conductors 134 and 118. As has been pointed out above, the output of the square wave generator is a series of square negative waves which begin with the closing of the points 16 and 17. In other words, the square wave is negative while the points are closed and moves in a positive direction as soon as the points open. The capacitor 133 has the effect of differentiating this square wave so as to produce a negative peak at the beginning of the negative component of the square wave and a positive peak at the end of this negative component. The diode 132 connected between the base of transistor 129 and ground, serves to bypass the negative peaks allowing only the positive peaks to be applied to the base of the transistor 129, the positive peaks occurring substantially at the time that the points reopen. The application of the positive peak to the base of the transistor causes the transistor to abruptly become conductive causing current to flow through the resistor 130, the emitter-collector circuit of transistor 129, and the resistor 131. The result of this is that a voltage drop is produced across resistor 130 causing the lower terminal of this resistor to be negative with respect to the upper terminal. In other words, each time that the points open, a voltage pulse is produced across resistor 130 to cause the lower terminal to become negative. This voltage is in turn applied to the input terminal of amplifier 125, when the switches of switch 115 are all in the position shown, by a connection which extends from the lower terminal of resistor 130 through the output terminal 135 of the sweep unit, conductor 136, the fixed contact 117, the series of switches in switch assembly 115, including the right-hand switchblade 116, conductor 137, contact 138, switchblade 110, and conductor 140 to the input of amplifier 125. The amplifier 125 is designed to become conductive whenever a negative signal is applied thereto. Conductivity of the amplifier 125 causes a positive voltage to be applied to the SCR 142 to in turn discharge the capacitor 143. As soon as the capacitor is discharged, it starts recharging again through one of the circuits described above, depending upon the position of the switch 147. As soon as another positive pulse is applied to the base of transistor 129 as the result of the points again opening, the entire process is repeated. Under these conditions, the horizontal sawtooth voltage is applied to the input of amplifier 120 and to the horizontal deflection plates 37 of the cathode-ray tube 35, the sweep starting with the opening of the points. This results in the type of display shown in FIG. 3.

As has been pointed out above, one of the objects of the present invention is to provide for the sweep voltage starting from the time that the points are closed. This is accomplished in our apparatus whenever the switch 105 is in either the primary pattern or secondary pattern position and one of the switches of switch 115 is moved to the opposite position from that shown. Considering first the conditions under which it is desired to have a superimposed signal, it is merely necessary to move switchblade 116 of switch 115 from the position shown in which it is in engagement with the lower fixed contact to its upper position in which it is in engagement with the upper fixed contact. When this happens, the circuit connection between output terminal 135 of the inverter stage 124 of the sweep circuit and conductor 137 leading to contacts 138 and 139 of the selector switch 105 is interrupted. At the same time, a direct connection is established between conductor 134, connected to output of square wave generator 65, and conductor 137 leading to contacts 138 and 139, this connection being established between the upper fixed contacts of switch 115 and switchblade 116. Under these conditions, the output of the square wave generator 65 is directly applied through conductor 134, switchblade 116, conductor 137, contact 138, switchblade 110, and a conductor 140 to the input of the amplifier 125. As was pointed out previously, amplifier 125 is designed to become conductive whenever a negative voltage pulse is applied thereto. Also, as previously pointed out, the output of the square wave generator 65 is so phased that the initiation of the negative portion of the square wave begins with the closing of the switch contacts 16 and 17. Thus, amplifier 125, under these conditions, becomes conductive as soon as the switch points close, thus causing the SCR 142 to become conductive upon closure of the distributor points 16 and 17. Under these conditions, the capacitor 143 is now discharged when the points first close and begins to charge immediately following the closure of the points. The result is that the sweep voltage now applied to the amplifier 120 and hence to the horizontal deflection electrodes 37 begins at a time when the points first close and continues until they again reclose. This results in the type of display shown in FIGS. 2, 4, 5, 6, and 7.

Figure 2:
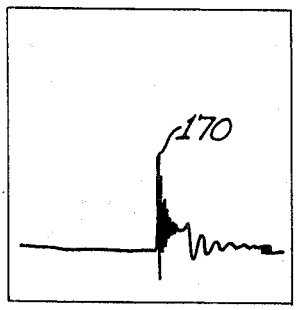
FIG. 2 is a view of the pattern obtained when all of the primary voltages are superimposed upon a single horizontal trace, this pattern beginning on the screen at the time that the points close, in accordance with one of the novel features of our invention.

In the foregoing discussion, no consideration has been given to the voltage applied to the vertical deflection plates 38. This voltage is controlled by the output of the vertical amplifier 160. This vertical amplifier may be of any suitable type which is capable of reproducing and amplifying signals of the frequency being measured and of the voltages employed to control the position of the trace vertically. The amplifier 106 has two input terminals, 161 and 162, these inputs having an additive effect so that the output of the vertical amplifier depends upon the cumulative value of the signals applied to the two input terminals 161 and 162. The voltage applied to terminal 161 is a signal voltage which is to be displayed while the voltage applied to input terminal 162 is a voltage which controls the overall vertical position of the particular sweep. Referring first to the voltage of input terminal 161, this voltage is derived, when switch 105 is in the "Primary Pattern" position from the voltage appearing across the points 16 and 17. This voltage, when the points open, is related to the voltage across the primary winding 11. The undergrounded switchblade 16 is connected by conductors 164 and 165 to one terminal of a voltage divider 166. The opposite terminal of the voltage divider 166 is connected to ground. Thus, the resistor of the voltage divider 166 is effectively connected across the points 16 and 17 so that the full voltage across the points appears across the resistor. A further conductor 167 is connected to a tap on this voltage divider close to the grounded end of the resistor so that the voltage existing between conductor 167 and ground is a relatively small part of the voltage occurring across points 16 and 17. This is desirable since the voltage appearing across 16 and 17 is relatively high and it is desired to apply to the amplifier only a small portion of the voltage. The conductor 167 is in turn connected to a contact 168 with which the switchblade 113 of selector switch 105 is in engagement. The switchblade 113 is, in turn, connected through a conductor 169 to the input terminal 161 of the vertical amplifier 160. Thus, when the switches are in the position shown, a selected relatively small portion of the voltage across the points 16 and 17 is applied to the input terminal 161. Assuming, as has been done, that the switches are so disposed that a superimposed voltage is desired, the trace on the oscilloscope screen will appear like that shown in FIG. 2 if switchblade 116 of switch 115 is in its upper position, and like that shown in FIG. 3, if the switchblade 116 is in the position shown. It will be noted that at the instant the points open, as indicated by the reference numeral 170 in the two FIGS. the voltages rise abruptly and then decays in an oscillatory manner until the points reclose. It will also be noted from a comparison of FIGS. 2 and 3 that in FIG. 3, a part of the portion of the voltage wave existing at point 170 is missing since when the sweep begins as a result of the opening of the points, a very small portion of the signal appears at the end of the trace. In the process of the trace returning to zero and starting again, some of the voltage signal is lost. In the arrangement of FIG. 2, the entire voltage signal appears at the center of the trace and none of this is lost. The apparatus of the present invention provides for both types of display shown in FIGS. 2 and 3 since operators of this equipment have been accustomed to a showing like that of FIG. 3. Thus, with the present apparatus, the operator may obtain either the type of display shown in FIG. 3, with which he has been familiar over the years, or the new type of display shown in FIG. 2 which has a marked superiority over that shown in FIG. 3 for the reasons pointed out above.

In the foregoing description, no reference has been made to any signal being applied to the input terminal 162 of the vertical amplifier 160. In other words, it has been assumed that the horizontal trace has been held at a constant vertical position. The vertical amplifier is preferably provided with conventional means, not shown, for adjusting the vertical position of the trace. Where the pattern being shown is a superimposed pattern as in FIGS. 2 and 3, it is only necessary to have a constant voltage applied to the vertical deflection plates. Where, however, it is desired, employment is made to display simultaneously the condition existing in the individual cylinders, a raster signal generating unit 170 which changes the level of the sweep each time that the sweep is retraced. This unit employs two transistors 171 and 172, transistor 171 being an NPN transistor and 172 a PNP transistor. Transistor 171 is effective to periodically discharge a capacitor 173 which in discharging builds up a charge on capacitor 174 in series with capacitor 173. Capacitor 173 is discharged each time that the points 16 and 17 open so that capacitor 174 is charged in a series of steps. When the engine has completed its cycle of operation, the transistor 172 is rendered conductive to fully discharge the capacitor 174 and the cycle is repeated. The voltage across capacitor 174 is amplifier by an amplifier 175 and a selected portion of the output voltage is applied to the input terminal 162 of the vertical amplifier.

Since it is desired to have the raster unit 170 operating only when switch 105 is in its "Primary Pattern" and "Secondary Pattern" positions, provision is made for energizing the amplifier 175 only when the switch is in these two positions. Energizing current to the amplifier 175 is applied by a conductor 177 connected to two switch contacts 178 and 179 engaged by the arm 111 of switch 105 with the switch in its "Primary Pattern," "Secondary Pattern" positions, respectively. The switchblade 111 is connected by a conductor 180 to a suitable positive source of potential such as ±10 volts. It will be obvious that when the switch 105 is in either the "Parade" or "Power Check" positions, no power is applied to amplifier 175 so that there is no output from that amplifier.

Provision is also made for varying the effect of the staircase signal generator by the raster unit 170. The output of amplifier 175 is connected across a potentiometer comprising a resistor 182 and a slider 183. Slider 183 is connected by conductor 184 to the input terminal 162 of the vertical amplifier 160 to conductor 184. Thus, the voltage applied to the terminal 162 is the voltage existing between slider 183 and ground. A capacitor 185 is connected between the slider 183 and ground to filter out any AC voltage components that might be present in the output of the amplifier. Where it is desired to have only a single horizontal trace as where the signals of the various cylinders are imposed upon one another, the slider 183 is moved to its lowermost position in which position the terminal 162 is connected directly to ground and none of the signal from amplifier 175 is applied to the input terminal 162.

Referring now in more detail to the specific circuitry of the raster unit 170, the base of transistor 171 is connected to the ungrounded output terminal of square wave generator 65 through conductors 134, 187, a differentiating capacitor 188, and a diode 189. As previously explained, the output of the square wave generator 65 is a square wave, each negative peak of which is initiated with the closing of the points 16 and 17. The differentiating capacitor 188 induces a negative pulse at the beginning of the negative portion of the square wave and a positive pulse at the end of the negative portion of the square wave. Due to the diode 189, only the positive pulse is applied to the base of transistor 171. The positive pulse is effective to turn on transistor 171. Each time that it is turned on, the capacitor 173 discharges through a path extending through the emitter-collector path of transistor 171, through resistor 191, capacitor 174 and a diode 192. The discharge of capacitor 173 through this path tends to charge capacitor 174 by a predetermined amount. Due to the presence of diode 192 and a diode 193, the charge, which has a polarity such that the upper terminal of capacitor 174 is negative with respect to the lower terminal, cannot leak off as long as transistor 172 is nonconductive. As soon as transistor 171 ceases to be conductive, capacitor 173 recharges through a path extending through a resistor 194 connected to a positive source of voltage such as +20 volts, capacitor 173 and diode 193 to ground. Thus, immediately following the discharge of capacitor 173 and the subsequent turning off of transistor 171, capacitor 173 is again recharged. The next time that the points open following the termination of the negative portion of the output of square wave generator 65, transistor 171 is again caused to be conductive and capacitor 173 again discharges through capacitor 174. The result is that the charge of capacitor 174 is built-up in a series of steps, the increase in the charge across capacitor 174 occurring each time that the points open. It is this voltage across capacitor 174 which is amplified by amplifier 175 and applied to the vertical amplifier 160.

Referring now to the operation of transistor 172, the base of this transistor is connected to a voltage divider consisting of series-connected resistors 194, 195 and 196 connected between the positive source of voltage to which resistor 194 is connected, and ground. The base of transistor 172 is connected to the junction of resistors 195 and 196 and the value of the various resistors just named is such that the base is normally maintained at a positive potential to keep the transistor turned off. The output of square wave generator 66 which, as previously explained, has its input energized in accordance with the voltage supplied to a selected plug such as plug 24, is connected by a conductor 200, a differentiating capacitor 201, conductor 202, and a diode 203, to the base of transistor 172. As previously pointed out, a negative square wave pulse is initiated each time that a firing voltage is applied to the sparkplug 24. The capacitor 201 serves to differentiate this pulse, causing a negative pulse to be produced at the beginning of the negative portion of the square wave voltage and a positive pulse on the termination of the negative portion of the square wave voltage. The positive pulse is prevented from being applied to the base of transistor 172 by a diode 203 so that only the negative pulses are applied to the base. The application of such a negative pulse to the base of transistor 172 causes it to become conductive. Thus, transistor 172 is rendered conductive each time that a firing voltage is applied to the plug 24. As previously explained, when transistor 172 becomes conductive, a discharge circuit is provided for the capacitor 174, this discharge circuit extending through resistor 191, an emitter resistor 206, and an emitter-collector path of transistor 172 back to the upper terminal of capacitor 174. The resistors 191 and 206 have relatively low resistance values so that the capacitor 174 is effectively short-circuited under these conditions. This results in the charge on capacitor 174, which has accumulated as the result of the successive charging thereof by the discharge of capacitor 173, being completely dissipated.

It will be readily apparent from the foregoing that the voltage existing between the upper and lower terminals of capacitor 174 increases in a negative direction in a series of steps, each step being initiated by the opening of points 16 and 17. When the engine has completed its cycle and the firing voltage is again applied to plug 24, capacitor 174 is discharged and the entire cycle is repeated. The result is that a "staircase" voltage is applied to the input of amplifier 175 and a selected portion of this staircase voltage is applied to the input terminal 162 of vertical amplifier 160.

Figure 4:
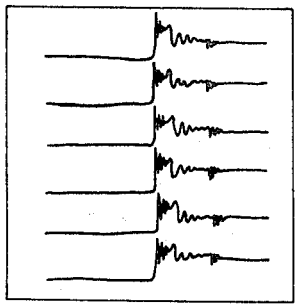
FIG. 4 is a raster display for a six-cylinder engine with a separate horizontal trace line for each cylinder of the engine.

The effect of the application of this staircase voltage to the amplifier input terminal 162 is to impose upon the voltage applied to the vertical deflection plates, a further voltage which decreases each time that the points open. The result is that the trace for each separate cylinder is vertically displaced from the immediately preceding cylinder, as far as the firing order is concerned. Since the horizontal sweep voltage drops to zero each time that the plug is opened or closed, it will be obvious that the result is a series of parallel raster lines disposed vertically from each other by uniform steps, as shown in FIG. 4. Since the horizontal sweep starts with the closing of the points and each change in the staircase voltage occurs at the opening of the points, the shift in the height of the raster pattern occurs at an intermediate point of the trace as indicated by lines 207.

As previously explained, when all of the signals from the various cylinders are to be superimposed upon one another, all that it is necessary to do is to move the slider 183 to its lowermost position. This results in the raster signal being eliminated so that the vertical deflection plates are maintained at a fixed voltage. Thus, each time that the horizontal trace is repeated, it occurs over the same portion of the cathode-ray tube so that all of the various traces are superimposed upon each other.

As indicated above, it is possible to have the condition of any one cylinder or any combination of cylinders displayed independently. This is particularly valuable where trouble is suspected in connection with one or two specific cylinders and it is desired to have an enlarged display of the conditions only in those cylinders. In order to do this, it is necessary that the trace be blanked out when cylinders other than those desired would normally be displayed. This is done by a blanking circuit 210 which is effective to apply a negative voltage to the control grid 41 of cathode-ray tube 35 during those portions of the engine cycle in which the cylinders to be observed are not being effectively operated. The blanking circuit 210 comprises a normally free-running multivibrator 212 and a transistor 213 which, when conductive, stops the operation of the multivibrator as long as transistor 213 is conductive. The output of the free-running multivibrator is connected through a conductor 214, a blocking capacitor 215, a diode 216, and conductor 217 to the control grid 41. The square wave voltage passing through the capacitor 215 is applied across a resistor 218 connected between the right-hand terminal of capacitor 215 and ground. The diode 216 acts to rectify the voltage across the resistor 218 so that only the negative portions of this voltage are applied to the grid 41. A capacitor 219 is connected between conductor 217 and ground so as to filter the voltage applied to grid 41 to reduce the ripple component thereof.

Figure 6:
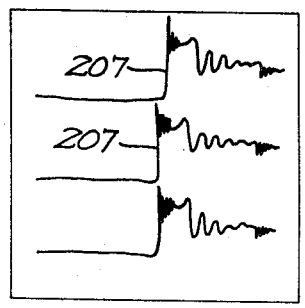
FIG. 6 is a view similar to FIG. 4 but with only half of the cylinders being displayed.

The free-running multivibrator 212 is of a conventional type employing two PNP transistors 220 and 221. The base of each transistor is connected to the collector of the other transistor by a capacitor and resistor connected in parallel. The interconnection between the two transistors 220 and 221 cause them to be alternately conductive for periods of time depending upon the time constants of the RC circuits including the capacitors. The transistor 213 is a PNP transistor, the collector of which is connected through a resistor 223 to a point 222 maintained at a positive source of potential such as +20 volts. The emitter of transistor 213 is connected through a resistor 216 to ground. The base of transistor 213 is connected through a further resistor 217 to the positive source of voltage at point 222. Normally, the transistor 213 is conductive and the multivibrator 212 does not operate. The base of the transistor 213 is connected by a conductor 219 to fixed contacts 220 and 221 associated with the switchblade 109 of the selector switch 105. Switchblade 109 is in turn connected to conductor 68 to which the switches 69 through 74 are connected. When one of these switches is closed, a voltage is applied to conductor 68 whenever the selected cylinder corresponding to the selected one of the switches 69—74 is in firing position. This voltage, which is positive at the time that the points close, is transmitted through conductor 68, switchblade 109, contact 221, and conductor 219 to the base of transistor 213 to cause the same to become sufficiently positive to turn on the transistor 213 and cause current flow through resistor 223, the collector-emitter circuit of transistor 213 and resistor 216 to ground. The current flow through resistor 223 results in a negative voltage with respect to the emitter of transistor 220 being applied to the base of transistor 220 to maintain this transistor conductive and prevent the oscillation of the multivibrator 212. The result is that an AC voltage is not produced by the multivibrator and due to the blocking action of capacitor 215, no voltage is applied to the grid 41. This enables the beam of the cathode-ray tube 35 to impinge upon the screen 36 so that while the multivibrator 212 is thus turned off, the trace is visible. As soon as the firing cycle of the selected cylinder has been completed, the positive pulse at the outlet of that stage of the counter is removed and transferred to the next stage. As a result, the positive voltage applied to the base of transistor 213 is removed and this transistor ceases to be conductive. As soon as it ceases to be conductive, the negative voltage across resistor 223 is no longer applied to the base of transistor 220 of the multivibrator and the multivibrator is free to operate to cause a negative voltage to be applied to grid 41, as described above. Thus, with the arrangement, a negative voltage is applied to the grid 41 during all portions of the engine cycle other than that associated with the selected cylinder. If several of the switches 67—74 are closed, then the blanking circuit 210 operates to blank out the operation of the cathode-ray tube 35 only when the cylinders other than the selected ones are in their operating condition. The result is that it is possible to obtain a display involving only certain of the selected cylinders as shown in FIG. 6.

SECONDARY PATTERN

When the selector switch 105 is moved to a position in which the pointer of knob 106 extends into the portion of the indicator segment labeled "Secondary Pattern," the signal displayed in the cathode-ray tube 35 is dependent upon the voltage across the secondary winding. When the switch is so positioned, switchblades 108 through 114 are all moved to the next position moving in a clockwise direction. In this position, switchblades 109, 110 and 111 are in engagement with fixed contacts 220, 139 and 179. Since switch contacts 220, 139 and 179 are connected to switch contacts 221, 138 and 178, respectively, the change in position of these three switchblades has no effect on the operation. Switchblade 112, however, is now in engagement with a fixed contact 224 and switchblade 113 has moved out of engagement with contact 168 into engagement with the fixed contact 225. The movement of the switchblade 113 out of engagement with contact 168 breaks the connection previously referred to between the ungrounded switchblade 16 of the points to the vertical input terminal 161 of the vertical amplifier 160. The movement of switchblades 112 and 113 into engagement with fixed contacts 224 and 225 connects, as will presently be shown, a voltage dependent upon the voltage across the secondary to the input terminal 161 of the vertical amplifier.

Figure 5:
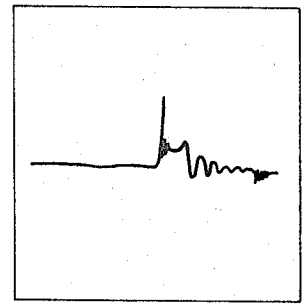
FIG. 5 is a view in which only one cylinder is being displayed and in which the secondary voltage is shown.

Connected to the upper terminal of the secondary winding 12 of ignition transformer 10 by a suitable detachable connection 226 is a shielded cable 227. A capacitor 228 is interposed in this connection. The shielded cable 227 leads to the engine analyzing apparatus of the present invention. The outermost terminal of this shielded conductor 227 is in turn connected through a capacitor 230 to ground at 231. A resistor 232 is connected in parallel with capacitor 230. It will be noted that capacitors 228 and 230 form a voltage divider across which is connected the output of the secondary winding 12. A conductor 223 is connected to the junction of capacitors 228 and 230 so that the voltage applied thereto is a portion of the voltage across secondary 12, the magnitude of this portion depending upon the relative values of capacitors 228 and 230. The conductor 233 is in turn connected to switchblade 112 which, as previously described, is now in engagement with the contact 224. Contact 224 is connected through a capacitor 235 to the ungrounded input terminal of an amplifier 236. A further capacitor 237 is connected across the input terminals of amplifier 236 to further divide down the secondary signal. The output terminal of amplifier 236 is in turn connected through a conductor 239 to fixed contact 225 which now is engaged by switchblade 113. As previously pointed out, switchblade 113 is connected by a conductor 169 to the input terminal 161 of vertical amplifier 160. Thus, with switchblades 112 and 113 in engagement with fixed contacts 224 and 225, a selected portion of the voltage across the secondary winding 12 is amplified and applied to the input terminal 161 of the amplifier so that the voltage occurring across the secondary winding is impressed on the trace. The pattern shown in FIG. 5 is typical of the pattern of the secondary voltage pattern.

As with the primary pattern, it is possible to obtain the superimposed pattern for all of the cylinders by simply moving the slider 183 on the output of the raster unit 170 to its lowermost position so that no raster pattern is imposed on the vertical amplifier. It is also possible to select any one cylinder or any combination of cylinders by selectively closing any one or several of the switches 69—74. Since the connection between conductor 68 connected to switches 69—74 and the input to the blanking unit 210 is present regardless of whether switchblade 109 is in engagement with contact 220 or contact 221, the operation of the blanking circuit is exactly the same as with the primary pattern display. As with the primary pattern display, whenever any one of the switches 69—74 is closed, the corresponding switches in the switch assembly 115 are also operated so that the inverter unit 124 is disconnected and the horizontal sweep circuit is started at the time that the points first close. The same is also true when the switch 116 of switch assembly 115 is moved to its upper position.

PARADE PATTERN

Figure 7:
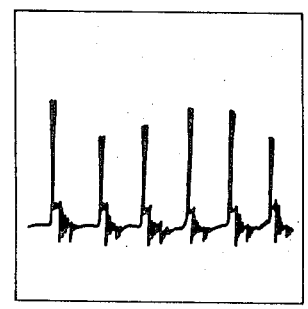
FIG. 7 is a parade display in which the signal being displayed is derived from the primary voltage.

When it is desired to have the information displayed in a parade pattern as in FIG. 7, the selector switch 105 is turned to its third position in which the pointer 106 is opposite the segment labeled "Parade." In this position, switchblades 109, 110, 111 and 112 are separated from the switch contacts previously referred to. The separation of switchblade 109 from contacts 220 and 221 interrupts the connection to the blanking circuit. Since the very purpose of a parade pattern is to display all of the cylinders, it is obviously unnecessary to have the blanking unit 210 in operation under these conditions. The separation of switchblade 110 from contacts 138 and 139 disconnects the input of the amplifier 125 of the sweep circuit from conductor 134 leading from the output of the square wave generator. During the operation with the raster display, it was desirable to have the horizontal sweep dropped back to zero each time that the points opened or closed. In the parade pattern, it is desirable to have a cycle of the sweep voltage extend for the entire length of the engine cycle. Hence, provision must be made for recycling the sweep voltage at the end of each complete cycle of engine operation. The movement of switchblade 111 out of engagement with contacts 178 and 179 disconnects the source of voltage of amplifier 175 of the raster unit so that the raster unit is no longer energized. This is important since it is no longer desired to have a raster voltage superimposed upon the voltage applied to the vertical deflection plates, as it is now desired to have the conditions of the various cylinders displayed along a single horizontal trace.

Referring first to the changes made in the horizontal sweep circuit, the inverter section 124 of the sweep generator is no longer effective since the output terminal 135 of this inverter section is disconnected from conductor 140 leading to amplifier 125 by the movement of switchblade 110 from engagement with contacts 138 and 139, as previously mentioned. The sweep voltage is now triggered by a voltage from one or the other of the two auxiliary output terminals 60 and 61 of the counter 45, depending upon whether a four or six-cylinder engine is being tested. If a four-cylinder engine is being tested, the switch 79 is closed and the auxiliary output terminal 60 of counter stage 4 is connected through the conductor 91, switch contact 84, switchblade 82 and conductor 242 to the input terminal of a pulse generator 243. If a six-cylinder engine is being tested, switch 80 is closed instead of switch 79 and the output terminal 61 of counter stage 6 is connected through conductor 92, switch contact 90 and switchblade 88 to the input terminal of pulse generator 243. Thus at the end of the engine cycle, a pulse is applied to the input of pulse generator 243. The voltage applied to input pulse generator 243 generates a negative pulse which is connected to the input of amplifier 125 through a circuit extending through conductor 245, fixed contact 246, switchblade 110 and conductor 140. As previously explained, the application of the negative pulse to amplifier 125 causes it to supply a signal to the SCR 142 to cause the same to become conductive and discharge the capacitor 143. The capacitor now starts recharging again at a rate determined by the apparatus previously described. The charging continues until the engine has completed another cycle at which time a new negative pulse is supplied to amplifier 125 to repeat the operation.

An important feature in the circuit arrangement just discussed is that the voltage for supplying a voltage pulse to the amplifier 125 is produced at the time when the last cylinder is in its firing cycle. Thus, the sweep voltage starts at approximately the time when the points close preparatory to the firing of the plug for the No. 1 cylinder. In previous devices, the initiation of the sweep circuit was developed as a result of the voltage being applied to the plug for the No. 1 cylinder with the result that the parade display usually started with the primary or secondary voltage in connection with the second plug to be fired. The result is that the parade display did not begin with the first plug in the sequence but rather with the second plug. With the present apparatus, where the sweep voltage is initiated with the firing of the last plug in the firing cycle, it is possible to start the parade display at the time that the points first close so that the No. 1 cylinder is the first one displayed in the sequence.

Referring to the sweep generator 123, it will be obvious that if capacitor 143 has the proper capacitance for the relatively short sweep cycle used with the raster display, it would not provide sufficient capacitance for the longer time cycle needed for the parade display. In order to provide for a longer sweep cycle, we have provided an auxiliary capacitor 248 which is connected in parallel with capacitor 143 when the selector switch 105 is in the "Parade" position. The upper terminal of capacitor 248 is connected to the upper terminal of capacitor 143. The lower terminal of the capacitor is connected through a conductor 249, a switchblade 114, and fixed contact 250 to ground. Thus when switchblade 114 is engaged with the contact 250, capacitor 248 is connected in parallel with capacitor 143. This effectively increases the time constant of the charging circuit involving resistor 144, current amplifier 145 and capacitor 143.

With the selector switch 105 in the "Parade" position, the signal applied to the input terminal 161 of the vertical amplifier 160 is based upon the secondary voltage signal. With the selector switch 105 in this position, the switchblade 113 is in engagement with a fixed contact 252 which, like contact 225, is connected to the output of amplifier 236. When the selector switch 105 was in the "Secondary Pattern" position, the input of amplifier 236 was connected to the secondary winding 12 through a capacitor 235, this connection being made through conductor 233, switchblade 112 and fixed terminal 224. When the selector switch 105 is in the "Parade" position, switch 112 is disconnected from contact 224 and moved into engagement with another fixed contact 253. This contact is connected to the input terminal of amplifier 236 through a variable capacitor 254. With switch 112 thus in engagement with fixed contact 253, a circuit is completed from the upper terminal of secondary 12 through the capacitor 228, shielded conductor 227, conductor 233, switchblade 112, fixed contact 253 and variable capacitor 254 to the input of amplifier 236. Thus, under these conditions, a selected portion of the secondary voltage is amplified and applied to the input terminal 161 of the vertical amplifier 160. The magnitude of the voltage spikes shown in FIG. 7 can be adjusted by adjusting the variable capacitor 254.

POWER CHECK

When selector switch 105 is turned to the "Power Check" position, the sparkplug of any one or more of the cylinders can be effectively short-circuited. At the same time, there is a "-parade" display on the cathode-ray tube so that the operator can verify that the selected plug or plugs is being short-circuited. At the same time, there is a "parade" display on the cathode-ray tube so that the operator can verify that the selected plug or plugs is being short-circuited.

Referring first to the apparatus for short circuiting the plugs, this apparatus is basically similar to that of the Marino application, Ser. No. 607,820, referred to above. As previously pointed out, the operation of the counter is started with the firing of the No. 1 sparkplug 24. At this time, a positive pulse appears at the output terminal 50 of stage 1 of the counter. When the second plug in the firing order is fired, the pulse appears at terminal 51 of stage 2 of the counter. This operation continues until all of the plugs have fired, at which time the counter is reset. These pulses are employed to control through a Schmidt trigger circuit 256 a silicon-controlled rectifier 257, which is in turn effective to provide a short circuit across the points 16 and 17. It will be noted that with the selector switch 105 in the "Power Check" position, switchblade 108 is in engagement with a fixed contact 258. With the switch in this position, a circuit can be traced from switchblade 16 through conductors 164 and 259, switchblade 108, fixed contact 258, a fixed resistor 260 and the anode and cathode of the silicon-controlled rectifier 257 to ground. In other words, except for the relatively small resistor 260, a short circuit is established across points 16 and 17 when the SCR 257 is fired. The firing of the SCR 257 is controlled by the Schmidt trigger circuit 256 which applies a signal to the gate electrode of SCR 257. The input circuit to the Schmidt electrode is controlled, as previously pointed out, by the pulses from the selected stages of counter 45. Let it be assumed for example, that the third sparkplug in the firing order is to be effectively short-circuited. Under these conditions, switch 71 is closed. This causes a pulse to be applied, at the time that the points 16 and 17 close preparatory to firing of this third sparkplug, through conductor 68, switchblade 109 and a fixed contact 261 to the input circuit of the Schmidt trigger. The Schmidt trigger circuit 256 is designed to produce a sharp square wave pulse at its output terminal when a pulse is applied to its input terminal. This output pulse is in turn applied to the gate electrode of the SCR 257 to render the same conductive and to short circuit the points 16 and 17. The SCR 257 remains conductive during the time the points are open so that no voltage pulse is produced in secondary 12 and hence no voltage pulse is applied to the third sparkplug. It will be obvious that if several sparkplugs are to be effectively short-circuited, several of the switches 69 through 74 are closed and, under these conditions, the plugs corresponding to the closed switches 69 through 74 are effectively short-circuited.

As previously pointed out, provision is made for resetting the ring counter 45 even though plug 24 is being effectively short-circuited for test purposes. This is done by deriving a signal from either auxiliary output terminal 60 or 61 of ring counter 45, depending upon whether a four or six-cylinder engine is being tested, and applying this signal through switches 79 and 80 and the square wave generator 98 to the reset terminal 99. Thus, under these conditions, the counter is reset from a signal produced at the time the last plug is being fired so that even though the No. 1 plug is being effectively short-circuited the counter continues to operate normally.

Referring to the operation of the cathode-ray tube 35, when the selector switch 105 is in the "Power Check" position, this operation is basically the same as when the switch 105 is in the "Parade" position. It will be noted that switchblades 110, 112, 113 and 114 are in engagement with fixed contacts 264, 265, 266 and 267, respectively. In each case, however, the fixed contact now engaged by the switchblade is connected to the contact with which the switchblade was in engagement when in the "Parade" position. Thus, contacts 246 and 264 associated with switchblade 110 are electrically connected together. The same is true of contacts 253 and 265, 252 and 266, and 250 and 267. Switches 110, 112, 113 and 114 control the operation of the cathode-ray tube in both the "-Parade" and "Power Check" positions. Thus, the movement of the selector switch 105 to the "Power Check" position does not affect the display on the cathode-ray tube. It is still a "-parade" display of the secondary voltage. It will be obvious that if any sparkplug is effectively short-circuited, circuited, the "pip" associated with that sparkplug in the "parade" display of FIG. 7 will no longer be present and the operator will know that that particular sparkplug is being effectively short-circuited.

The purpose of shorting selected sparkplugs is to be able to observe the effect on the engine operation if a particular sparkplug is disabled. This can be done by either using a dynamometer, by observing the change in speed of the engine, or by any of the other means commonly employed for observing engine performance.

CONCLUSION

It will be seen that we have developed an engine analyzing apparatus in which a signal indicative of the condition of the ignition system is superimposed on a horizontal trace of a cathode-ray tube and in which the horizontal trace may be initiated at the time when the distributor points close rather than when they open. In this way, it is possible to have the voltage effect being observed appear at an intermediate point of the trace and not be interrupted by reason of the trace being repeated. It will also be seen that we provide for either a "raster" display or a "parade" display. The apparatus provides for great flexibility in the type of display presented. Where a "raster" display is being employed, the voltage displayed may be either the primary or secondary voltage of the ignition system. The display may either start with the points closed position or, if the operator prefers, with the points open position. Where a "parade" display is being employed, the display starts with the points closed position and the first plug displayed is the first plug in the firing order, as distinguished from prior devices where the first plug displayed is the second plug in the firing order.

While we have shown a specific embodiment of our invention for purposes of illustration, it is to be understood that the scope of the invention is to be limited solely by the appended claims.

We claim:

1. An apparatus for displaying a condition associated with the operation of an internal combustion engine having an ignition system including an igniter for igniting the fuel within a cylinder of the engine and an electrical voltage pulse generating means for applying voltage pulses to said igniter to cause energization thereof, said voltage pulse generating means comprising a switch which is periodically opened and closed and which is effective to produce a voltage pulse each time that said switch is opened, said apparatus comprising:

a cathode-ray tube having a display screen;

means for producing a substantially horizontal trace on said screen each time that a voltage pulse is applied to said igniter;

means responsive to a condition of said ignition system associated with the application of a voltage pulse to said igniter for variably displacing said horizontal trace in a vertical direction to indicate the character of said condition; and means controlled by said switch and responsive to the closing of said switch for initiating said horizontal trace at a time substantially prior to the time when said switch subsequently opens to produce the voltage pulse associated with the condition being observed so that the condition of said ignition system resulting from the application of the voltage pulse to said igniter is displayed on an intermediate portion of said trace.

2. The apparatus of claim 1 in which the engine has a plurality of cylinders and an igniter for each cylinder with a distributor for sequentially applying each generated pulse to the igniter of a different cylinder in a predetermined sequence and in which there are a plurality of parallel traces equal in number to the number of igniters with means for initiating a different one of said traces each time that said switch is closed.

3. The apparatus of claim 1 in which the engine has a plurality of cylinders and an igniter for each cylinder with a distributor for sequentially applying each generated pulse to the igniter of a different cylinder in a predetermined sequence and in which there is a single substantially horizontal trace which continues for a complete operating cycle of the engine and in which there is means for initiating said trace once each cycle of said engine at a time when said switch is closed and for terminating said sweep each time that a predetermined one of said igniters is energized.

4. The apparatus of claim 3 in which the means for terminating each sweep is responsive to a condition associated with the firing of the last of the igniters to be fired in the firing sequence of the engine so that said sweep is again started just prior to the firing of the first igniter to be fired in the firing sequence.

5. The apparatus of claim 1 in which means including a switching device is selectively operative to cause said trace to be initiated when said first named switch first opens rather than as a result of the first named switch first closing.

6. The apparatus of claim 1 in which the means controlled by said switch comprises means connected to said voltage pulse generating means for deriving from the voltage across said switch a periodically cyclically varying voltage therefrom, a square wave generator connected to said last named means for generating a square wave voltage substantially in phase with said cyclically varying voltage, and means connected to the output of said square wave generator and to said means for producing a horizontal trace for initiating said horizontal trace when the instantaneous value of said square wave changes in a manner resulting from closure of said switch.

7. The apparatus of claim 1 in which the cathode-ray tube has X-axis and Y-axis electrodes, in which there is means connected to an X-axis electrode for applying to said X-axis electrode a sawtooth sweep voltage having a frequency equal to the frequency of operation of said switch and in which each cycle of the sweep voltage is initiated upon closing said switch, and in which means controlled by said condition responsive signal applies a voltage to a Y-axis electrode which depends in magnitude and phase upon the magnitude and phase of the ignition condition sensed by said condition responsive means.

8. The apparatus of claim 7 in which the engine has a plurality of cylinders and an igniter for each cylinder with a distributor for sequentially applying each generated pulse to the igniter of a different cylinder in a predetermined sequence and in which apparatus there is means for developing a voltage applied to a Y-axis electrode which progressively changes in magnitude during a cycle equal in length to the time between successive energizations of one of said igniters.

9. The apparatus of claim 8 in which the voltage applied to a Y-axis electrode increases in steps by a predetermined amount each time that said above named switch opens and is reduced to a predetermined starting value each time that said one of said igniters is energized.

10. The apparatus of claim 1 in which the cathode-ray tube has an X-axis electrode in which there is means including a capacitor charging circuit for producing a sawtooth sweep voltage having a frequency equal to the frequency of operation of said switch, means responsive to the amplitude of said sweep voltage to adjust the time constant of said capacitor charging circuit to maintain said amplitude substantially constant as the speed of the engine changes, and means for applying said sawtooth sweep voltage to said X-axis electrode.

11. The apparatus of claim 1 in which the engine has a plurality of cylinders and an igniter for each cylinder with a distributor for sequentially applying each generated pulse to the igniter of a different cylinder in a predetermined sequence and in which there is means for selectively rendering any one of said igniters effectively inoperable and means for successively displaying on the screen of said cathode-ray tube conditions of said ignition system resulting from the application of voltage pulses to the various igniters.